(12) United States Patent
Samson

(10) Patent No.: US 9,105,249 B2
(45) Date of Patent: Aug. 11, 2015

(54) ENERGY CONSERVATION IN A CONTROLLER USING DYNAMIC FREQUENCY SELECTION

(75) Inventor: Eric C. Samson, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 444 days.

(21) Appl. No.: 13/340,129

(22) Filed: Dec. 29, 2011

(65) Prior Publication Data

US 2012/0169746 A1 Jul. 5, 2012

(51) Int. Cl.
G06F 1/32 (2006.01)
G09G 5/36 (2006.01)
G09G 5/18 (2006.01)

(52) U.S. Cl.
CPC ............. *G09G 5/363* (2013.01); *G06F 1/324* (2013.01); *G09G 5/18* (2013.01); *G09G 2330/021* (2013.01)

(58) Field of Classification Search
CPC ....... G06F 1/324; G06F 3/14; G06F 11/3485; G06F 17/30823; G06F 17/30825; G09G 5/363; G09G 5/18; G09G 2330/021
USPC .......................................................... 713/320
See application file for complete search history.

(56) References Cited

U.S. PATENT DOCUMENTS

| 5,953,020 | A * | 9/1999 | Wang et al. .................... 345/558 |
| 7,634,668 | B2 | 12/2009 | White et al. |
| 7,886,164 | B1 | 2/2011 | Alben et al. |
| 8,099,618 | B2 * | 1/2012 | Vorbach et al. ................ 713/400 |
| 8,193,831 | B1 * | 6/2012 | Kadosh et al. ................... 326/93 |
| 8,250,394 | B2 * | 8/2012 | Agrawal ........................ 713/322 |
| 8,335,941 | B2 * | 12/2012 | Chang et al. ................... 713/600 |
| 2001/0011356 | A1 * | 8/2001 | Lee et al. ....................... 713/322 |
| 2001/0029556 | A1 * | 10/2001 | Priem et al. ...................... 710/23 |
| 2002/0169990 | A1 * | 11/2002 | Sherburne, Jr. ................ 713/300 |
| 2003/0007394 | A1 * | 1/2003 | Phi et al. ........................ 365/200 |
| 2003/0115428 | A1 * | 6/2003 | Zaccarin et al. ............... 711/156 |
| 2005/0289377 | A1 * | 12/2005 | Luong et al. ................... 713/322 |
| 2006/0161799 | A1 * | 7/2006 | Degenhardt .................... 713/600 |

(Continued)

FOREIGN PATENT DOCUMENTS

WO 2013/101829 A1 7/2013

OTHER PUBLICATIONS

Hurd, "Programmable Power Performance Optimization for Graphics Cores", U.S. Appl. No. 13/539,414, filed Jun. 30, 2012, 47 pages.
International Search Report and Written Opinion received for PCT Patent Application No. PCT/US2012/071653 mailed on Apr. 29, 2013.

(Continued)

*Primary Examiner* — Thomas Lee
*Assistant Examiner* — Danny Chan
(74) *Attorney, Agent, or Firm* — Jordan IP Law, LLC

(57) ABSTRACT

Systems and methods of adjusting a frequency of a graphics controller may include a logic to determine a metric associated with an input/output (I/O) queue. The metric may be used to determine whether an I/O limited condition exists. The I/O limited condition may be associated with a graphics controller. There may be a logic to cause a frequency of the graphics controller to be decreased when the I/O limited condition exists, and a logic to cause the frequency of the graphics controller to be increased when the I/O limited condition does not exist. The I/O limited condition may exist when a magnitude of the metric is equal to or greater than a first threshold. The I/O limited condition may not exist when the magnitude of the metric is equal to or less than a second threshold.

16 Claims, 6 Drawing Sheets

(56) References Cited

U.S. PATENT DOCUMENTS

| | | |
|---|---|---|
| 2006/0259804 A1* | 11/2006 | Fry .............................. 713/324 |
| 2007/0206683 A1 | 9/2007 | Lin |
| 2008/0235364 A1 | 9/2008 | Gorbatov et al. |
| 2010/0218029 A1 | 8/2010 | Floyd et al. |
| 2010/0274938 A1 | 10/2010 | Anand et al. |
| 2011/0022871 A1 | 1/2011 | Bouvier et al. |
| 2012/0169746 A1 | 7/2012 | Samson |
| 2014/0002467 A1 | 1/2014 | Hurd |

OTHER PUBLICATIONS

International Preliminary Report on Patentability and Written Opinion received for PCT Patent Application No. PCT/US2012/071653, mailed on Jul. 10, 2014, 7 pages.

Office Action received for U.S. Appl. No. 13/539,414, mailed on Nov. 10, 2014, 12 pages.

Office Action received for U.S. Appl. No. 13/539,414, mailed on Jul. 16, 2014, 16 pages.

* cited by examiner

ENERGY CONSERVATION IN A CONTROLLER USING DYNAMIC FREQUENCY SELECTION

BACKGROUND

A graphics workload may exhibit diverse behaviors during a course of a frame draw, wherein processing different parts of a frame may be limited by different factors. For example, the processing of one part of the frame may be limited by available resources inside a graphics controller, while the processing of another part of the frame may be limited by input/output (I/O) bandwidth.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Embodiments may involve an apparatus which may include logic to determine a metric associated with an input/output (I/O) queue. The metric may be used to determine whether an I/O limited condition exists, wherein the I/O limited condition may be associated with a graphics controller. There may be logic to cause a frequency of the graphics controller to be decreased when the I/O limited condition exists, and logic to cause the frequency of the graphics controller to be increased when the I/O limited condition does not exist.

Embodiments may involve a system which may include a processor and a graphics controller coupled to the processor. The graphics controller may be configured to operate at a decreased frequency based on being input/output (I/O) limited and at an increased frequency based on not being I/O limited. An I/O limited condition may exist when a magnitude of a metric associated with an I/O queue is at or greater than a first threshold. The I/O limited condition may not exist when the magnitude of the metric is at or less than a second threshold.

Embodiments may involve a computer implemented method which may include determining a metric associated with an input/output (I/O) queue. A magnitude of the metric may be high when the I/O queue is full and low when the I/O queue is not full, wherein the I/O queue may be associated with a graphics controller. The method may also include decreasing a frequency of the graphics controller when the magnitude of the metric is at or greater than a first threshold, and increasing the frequency of the graphics controller when the magnitude of the metric is at or less than a second threshold. The second threshold may be associated with a value less than a value associated with the first threshold.

Embodiments may involve a system which may include a processor, an external power supply coupled to the processor, and a graphics controller coupled to the processor. The system may include logic to decrease a frequency of the graphics controller based on being input/output (I/O) limited and increase the frequency based on not being I/O limited. An I/O limited condition may exist when a magnitude of a metric associated with an I/O queue is at or greater than a first threshold. The I/O limited condition may not exist when the magnitude of the metric is at or less than a second threshold.

Figure 1:
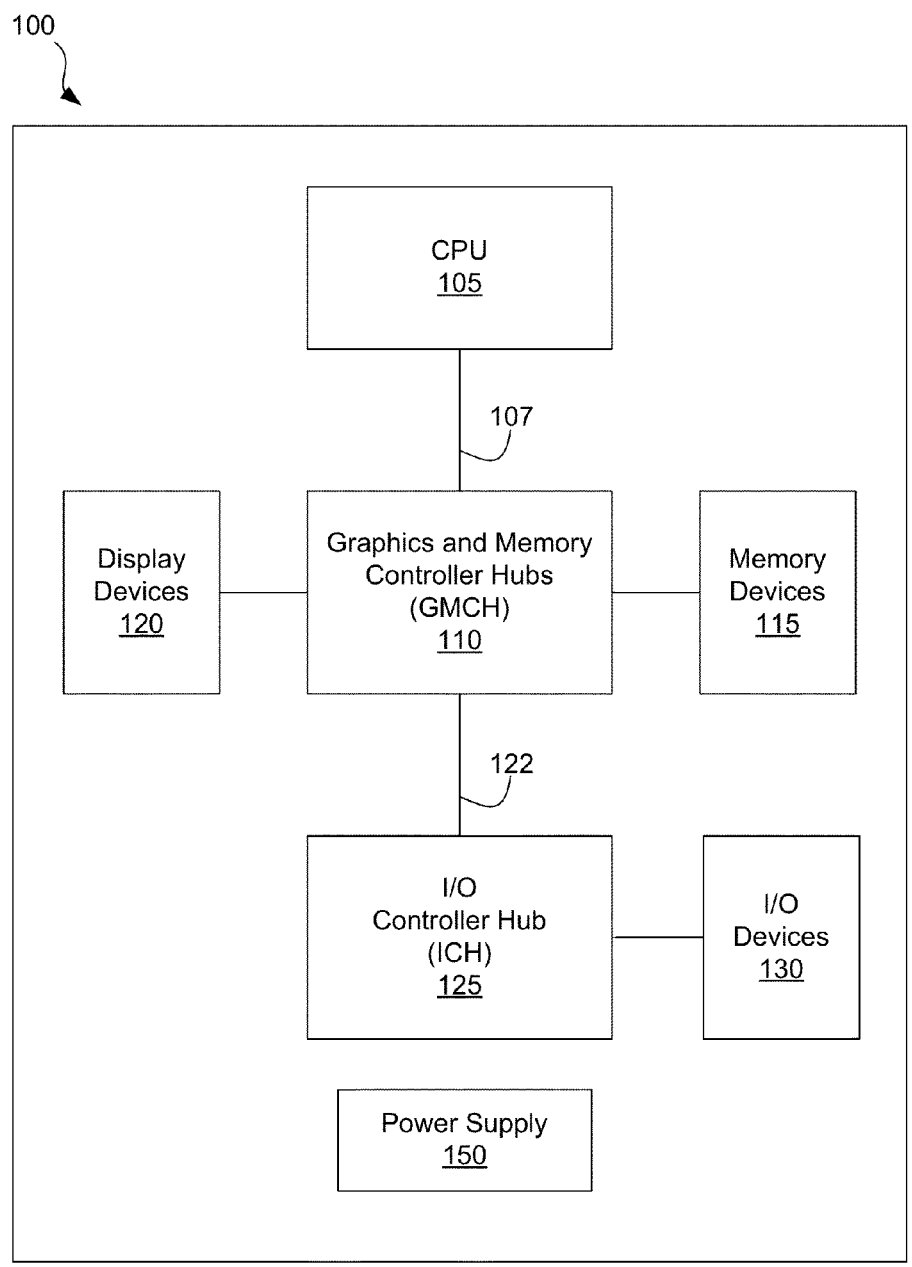
FIG. 1 is a block diagram that illustrates an example computer system, in accordance with some embodiments.

Turning to FIG. 1, a block diagram that illustrates an example computer system 100 is shown, in accordance with some embodiments. The computer system 100 may include a central processing unit (CPU) 105, a graphics and memory controller hub (GMCH) 110, and an input/output controller hub (ICH) 125. The GMCH 110 may be coupled to the CPU 105 via bus 107. The ICH 125 may be coupled to the GMCH 110 via bus 122. The GMCH 110 may also be coupled to memory devices 115 and display devices 120. The ICH 125 may be coupled to I/O devices 130. The GMCH 110 may include a graphics system 200 (shown in FIG. 2). Although the CPU 105, the GMCH 110 and the ICH 125 may be illustrated as separate components, the functions of two or more of these components may be combined. A power supply 150 may be used to provide power to the computer system 100. The power supply 150 may be a battery or an external power source. The computer system 100 may also include many other components; however, for simplicity, they are not shown.

Figure 2:
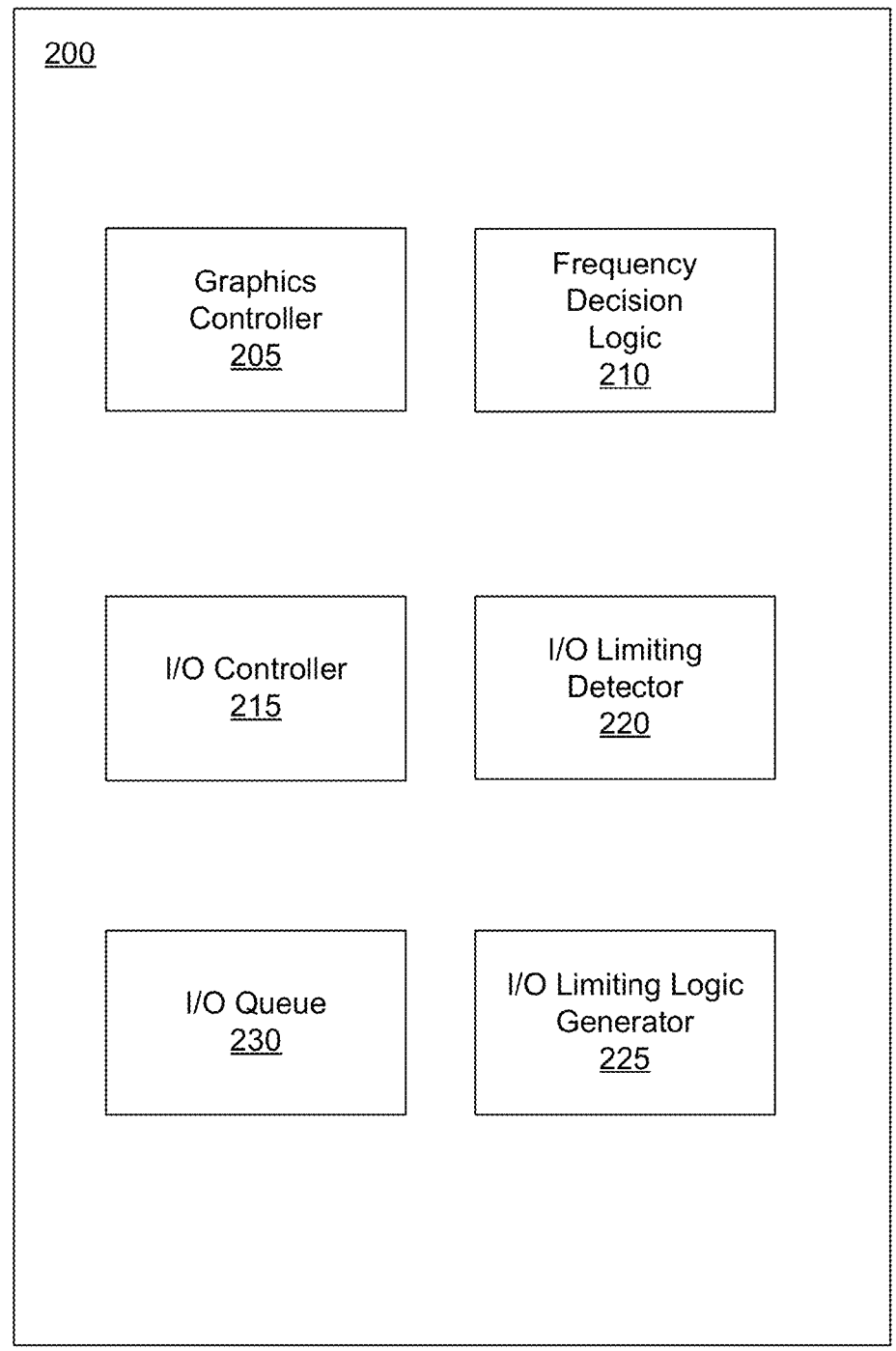
FIG. 2 is a block diagram that illustrates an example graphics system, in accordance with some embodiments.

Turning to FIG. 2, a block diagram that illustrates an example graphics system 200 is shown, in accordance with some embodiments. The graphics system 200 may include a graphics controller 205, frequency decision logic 210, graphics I/O controller 215, I/O limiting detector 220, I/O limiting logic generator, and I/O queue 230.

The I/O queue 230 may be configured to store graphics I/O requests so that they may be managed by the graphics I/O controller 215. Since the graphics controller 205 may operate at much faster speed than the graphics I/O controller 215, the graphics controller 205 may be able to make many more I/O requests than the graphics I/O controller 215 may be capable of handling those requests. As a result, the graphics controller 205 may have to wait until the I/O requests are serviced. This condition may be referred to as being I/O limited. In general, when the I/O queue 230 is full, the graphics controller 205 may be I/O limited. When the I/O queue 230 is not full, the graphics controller 205 may not be I/O limited.

The graphics controller 205 may be operating at a base frequency. For some embodiments, when the I/O limited condition exists, the frequency of the graphics controller 205 may be decreased to a lower frequency because there may not be any performance advantage for the graphics controller 205 to stay at the base frequency. Reducing the frequency of the graphics controller 205 when the I/O limited condition exists may be advantageous because it may enable reducing power consumption of the graphics controller 205 relative to the power consumption at the base frequency.

The I/O limiting logic generator 225 may be coupled to the graphics I/O controller 215 and the I/O queue 230. For some embodiments, the I/O limiting logic generator 225 may be configured to monitor an I/O metric that may be used to detect whether an I/O limited condition may exist. A magnitude of the I/O metric may vary depending on the status of the I/O queue 230. For example, the magnitude of the I/O metric may be based on the processing of the I/O requests in the I/O queue 230 by the graphics I/O controller 215. The magnitude of the I/O metric may be high when the I/O limited condition may exist for an extended period of time.

The I/O limiting logic generator 225 may be configured to generate a first signal and transmit the first signal to the I/O limiting detector 220 when the I/O limited condition exists. The first signal may cause the frequency of the graphics controller 205 to be decreased. For some embodiments, the I/O limiting logic generator 225 may also be configured to generate and transmit a second signal to the I/O limiting detector 220 when the I/O limited condition may no longer exist. The second signal may cause the frequency of the graphics controller 205 to be increased.

The I/O limiting detector 220 may be configured to determine whether an I/O limited condition exists beyond a threshold. It may be anticipated that when the I/O limited condition exists beyond the threshold, it may continue to exist for an extended period of time. When the threshold is met or exceeded, the I/O limiting detector 220 may generate a signal which may cause the frequency decision logic 210 to perform operations to throttle the frequency of the graphics controller 205. The frequency decision logic 210 may be coupled to a phase lock loop (PLL) (not shown) which may be configured to provide the frequency used by the graphics controller 205.

Figure 3:
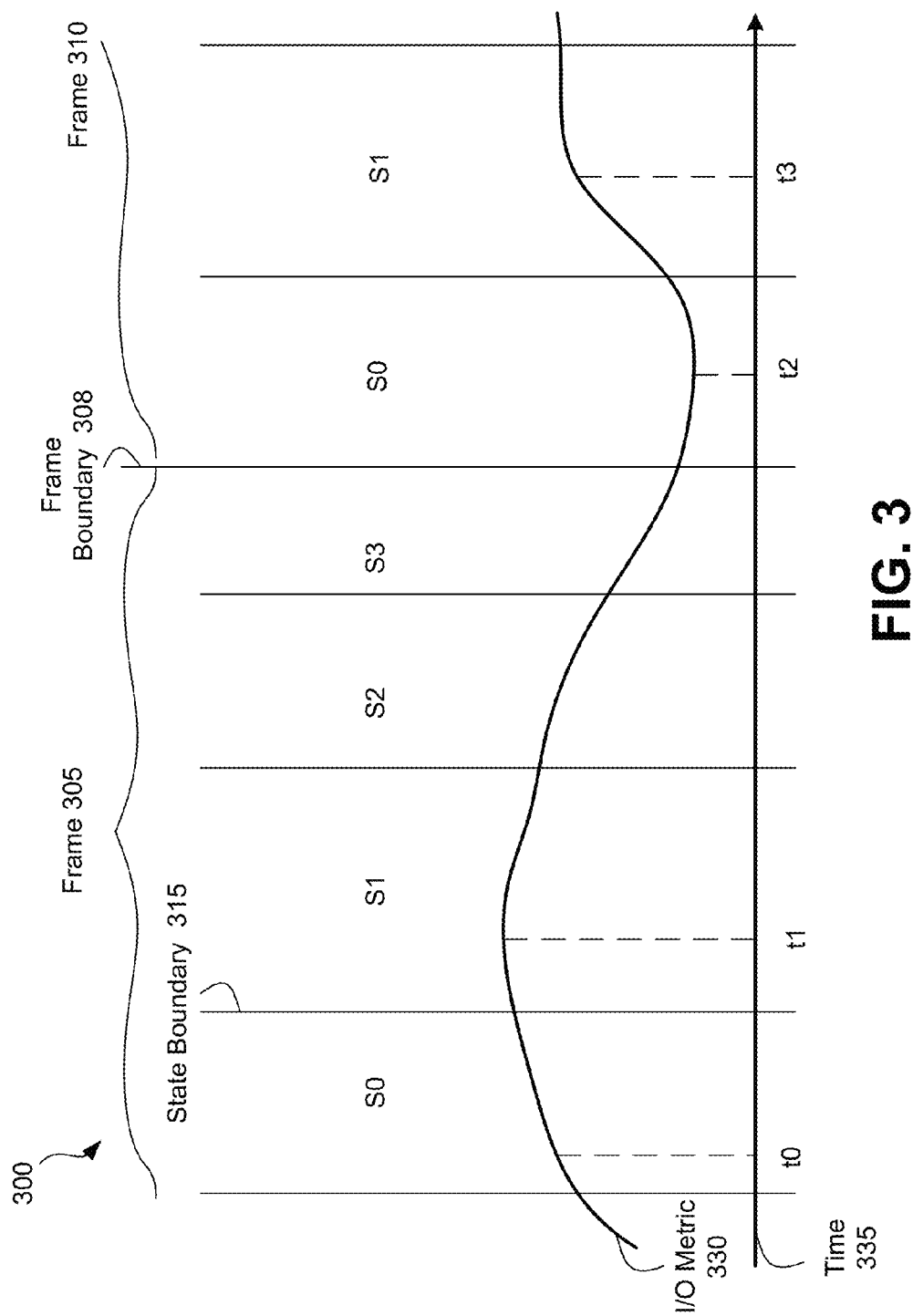
FIG. 3 is a diagram that illustrates example graphic frames, in accordance with some embodiments.

Turning to FIG. 3, a diagram 300 that illustrates two example frames is shown, in accordance with some embodiments. The diagram 300 may include frames 305 and 310 separated by frame boundary 308. Each of the frames 305 and 310 may be broken up into the same number of phases or states. For example, the frame 305 may include states S0, S1, S2 and S3 separated from one another by a state boundary. For example, the illustrated states S0 and S1 of the frame 305 are separated by state boundary 315. Each of the states S0, S1, S2 and S3 may be associated with a different duration. A line (not shown) may represent the base frequency of the graphics controller 205. Curve 330 may represent the I/O metric at any particular instance while the frames 305 and 310 and their states are being processed by the graphics controller 205. Line 335 may represent a time line.

In general, the I/O limited condition may tend to be bursty with a burst lasting about 1 millisecond (ms) in duration. As a comparison, a frame may generally last between 16 ms to 20 ms. In the current example, at time t0, the I/O metric 330 may indicate that the graphics controller 205 may be partially I/O limited. At time t1, the I/O metric 330 may indicate that the graphics controller 205 may be fully I/O limited and may benefit from operating at a low frequency (e.g., a frequency that is lower than the base frequency). At time t2, the I/O metric 330 may indicate that the graphics controller 205 may be least likely to be I/O limited and may benefit from operating at a higher frequency (e.g., a frequency that is closer to or at the base frequency 320). At time t3, the I/O metric 330 may indicate that the graphics controller 205 may not be I/O limited, and therefore it may be acceptable for the graphics controller 205 to operate at the base frequency.

It may be noted that the magnitude of the I/O metric 330 may vary at any particular time within the same state. For example, it may be possible to have the situations described at the times t1 and t2 occurring within the same state (e.g., state S2). As such, it may be possible to decrease the frequency of the graphics controller 205 from the base frequency 320 and then increase the frequency of the graphics controller 205 within the same state (e.g., state S2). For some embodiments, the evaluation of the magnitude of the I/O metric 330 may be independent of the frame boundary 308 and the state boundary 315. Thus, if the immediate past indicates that the graphics controller 205 is I/O limited or if the current instantaneous status indicates that the graphics controller 205 is I/O limited, then the frequency of the graphics controller 205 may be reduced instantaneously without having to be aware of which frame is currently being processed by the graphics controller 205. The technique of changing of the frequency of the graphics controller 205 during workload execution using the dynamic information from the I/O metric 330 may be referred to as a dynamic frequency limiter (DFL) technique.

Figure 4:
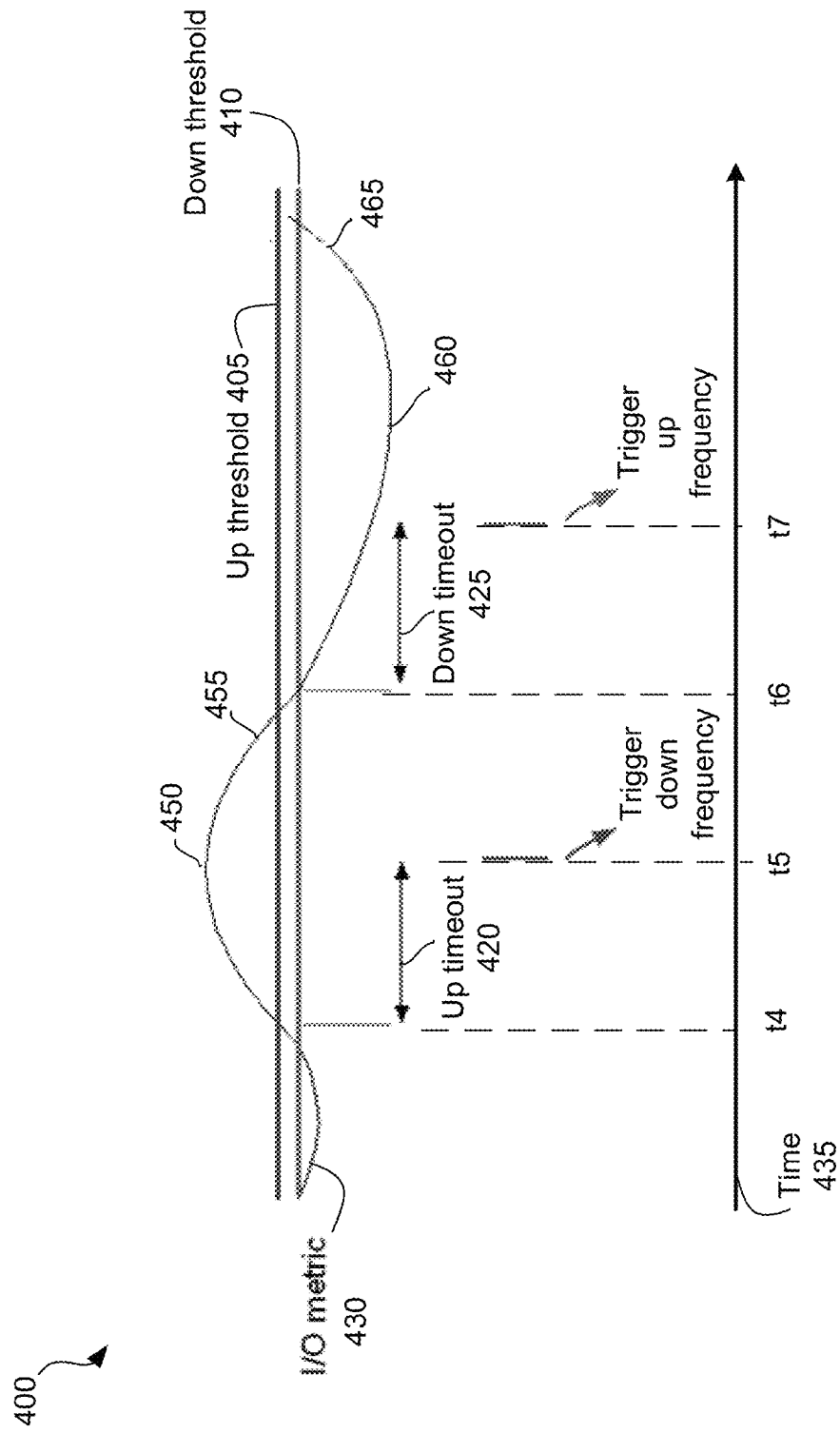
FIG. 4 is a diagram that illustrates thresholds that may be used with an input/output (I/O) metric, in accordance with some embodiments.

Turning to FIG. 4, a diagram 400 that illustrates thresholds that may be used with the I/O metric is shown, in accordance with some embodiments. The diagram 400 may include an I/O metric 430, an up threshold 405 and a down threshold 410. The up threshold 405 may be associated with an interrupt that may be triggered based on the I/O metric 430 being at or above the up threshold 405. Similarly, the down threshold 410 may be associated with an interrupt that may be triggered based on the I/O metric 430 being at or below the down threshold 410. For some embodiments, the I/O metrics 430 may be considered to be in an acceptable range when its magnitude is between the up threshold 405 and the down threshold 410.

For some embodiments, instead of immediately reducing a frequency of a graphics controller as soon as an I/O metric reaches or goes above an up threshold (e.g., the time period between t4 and t5), a short delay may be necessary to confirm that the I/O metric continues to exceed the up threshold long enough to justify the decrease of the frequency of the graphics controller. For example, at time t4, the I/O metric 430 may start to exceed the up threshold 405 which can indicate that the I/O limited condition may exist. A delay or up timeout 420 lasting from the time t4 to the time t5 may be necessary before the reduction of the frequency of the graphics controller 205 (shown in FIG. 2) may be triggered.

Similarly, instead of immediately increasing a frequency of a graphics controller as soon as a magnitude of the I/O metric reaches or goes below a down threshold (e.g., the time period between t6 and t7), a short delay may be necessary to confirm that the I/O metric may continue to go below the down threshold long enough to justify the increase of the frequency of the graphics controller. For example, at time t6, the I/O metric 430 may start to go below the down threshold 410 which can indicate that the I/O limited condition may no longer exist. A delay or down timeout 425 lasting from the time t6 to the time t7 may be necessary before the increase of the frequency of the graphics controller 205 may be triggered. The up timeout 420 and the down timeout 425 may be used to reduce the potential of changing the frequency of the graphics controller 205 too frequently which may impact the performance of the graphics controller 205. For example, if the I/O limited condition may exist for only one micro second, it may be difficult to estimate whether the I/O limited condition may continue, or it may end.

For some embodiments, when the I/O limited condition exists and the decrease of the frequency of the graphics controller 205 is triggered, the level of decrease of the frequency of the graphics controller 205 may be determined based on a current magnitude of the I/O metric. For example, when the current magnitude of the I/O metric is very high (such as at point 450), the frequency of the graphics controller 205 may be decreased by a large amount. When the current magnitude of the I/O metric is not very high (such as at point 455), the frequency of the graphics controller 205 may be decreased by a small amount. Similarly, when the current magnitude of the I/O metric 430 is very low (such as at point 460), the frequency of the graphics controller 205 may be increased by a large amount. When the current magnitude of the I/O metric is not very low (such as at point 465), the frequency of the graphics controller 205 may be increased by a small amount. For some embodiments, the frequency of the graphics controller 205 may be increased at most to the base frequency. For some embodiments, the increase and decrease of the frequency of the graphics controller is based on bins which may be a graphics frequency step sizing.

Figure 5:
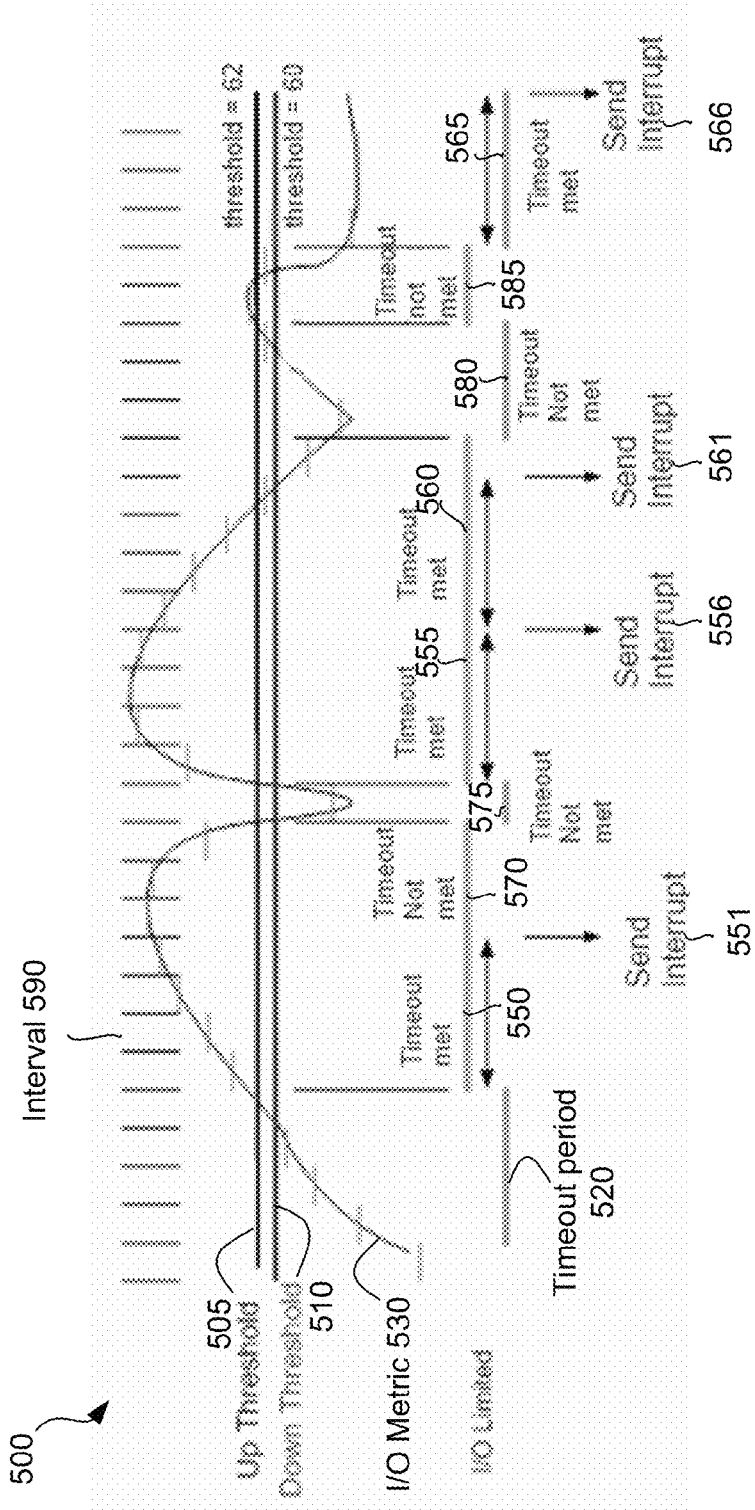
FIG. 5 is a block diagram that illustrates an example I/O metric and timeout periods, in accordance with some embodiments.

Turning to FIG. 5, a diagram 500 that includes an example I/O metric and timeout periods is shown, in accordance with some embodiments. The diagram 500 may include an I/O metric 530, an up threshold 505 and a down threshold 510. Interval 590 may represent a hysteresis interval associated with the I/O metric 530 and may be large enough prevent any potential of getting an interrupt to cause a change in the frequency of the graphics controller 205 (shown in FIG. 2) too quickly. A timeout period 520 may be set to be a multiple of the interval 590. In this example, the up threshold 505 may be associated with a value of 62, and the down threshold 510 may be associated with a value of 60. When a magnitude of the I/O metric 530 is above the up threshold 505 at least for the timeout period 520, an interrupt may be generated which may cause the frequency of the graphics controller 205 (shown in FIG. 2) to be decreased. When a magnitude of the I/O metric 530 is below the down threshold 510 at least for the timeout period 520, an interrupt may be generated which may cause the frequency of the graphics controller 205 to be decreased. As shown in FIG. 5, the timeout period 520 is met after the time intervals 550, 555, 560 and 565 and their respective interrupts 551, 556, 561 and 566 may be generated after each of these time intervals. The timeout period 520 is not met after the time intervals 570, 575, 580 and 585 and therefore no interrupt may be generated.

Figure 6:
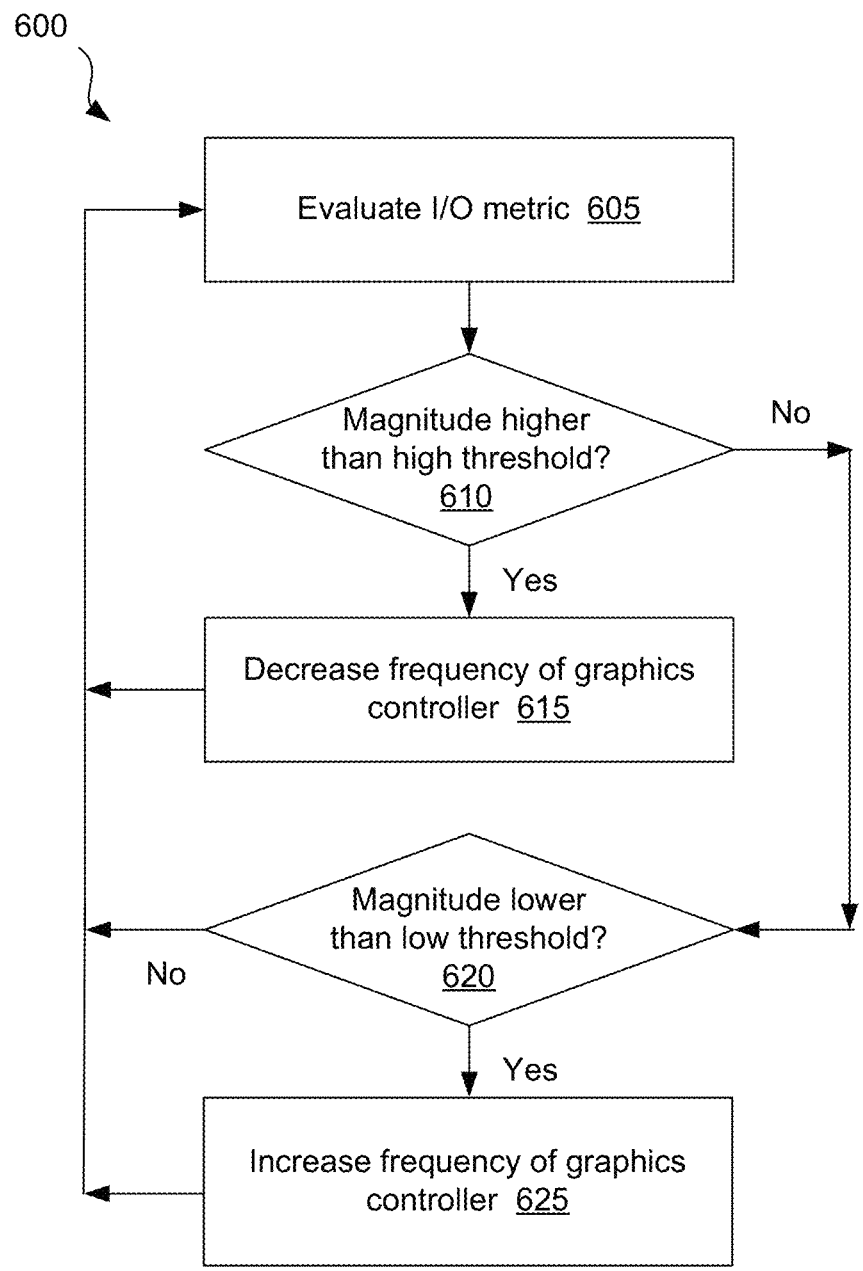
FIG. 6 is a flowchart of an example method of adjusting the frequency of a graphics controller based on an I/O limited condition, in accordance with some embodiments.

Turning to FIG. 6, a method 600 of adjusting the frequency of a graphics controller based on an I/O limited condition is shown, in accordance with some embodiments. The method 600 may be associated with a process performed by a graphics system such as the graphics system 200 of FIG. 2. At block 605, the I/O metric may be evaluated to determine its magnitude at a particular instance. At block 610, a comparison may be performed to determine whether an I/O limited condition may exist. The comparison may be based on the magnitude of the I/O metric at the particular instance and a high or up threshold value (e.g., up threshold 505 shown in FIG. 5). As described above, a timeout period (e.g., timeout period 520 shown in FIG. 5) may be used to determine when the I/O limited condition may exist.

When the I/O limited condition exists, the process may flow to block 615 where the frequency of the graphics controller may be decreased. The decrease of the frequency may be based on an amount difference between the up threshold value and a current magnitude of the I/O metric. When the difference is high, the decrease may be more. When the difference is low, the decrease may be less. Alternatively, the decrease of the frequency may be performed iteratively. For example, the frequency may continue to be decreased in small amounts until the I/O metric indicates that the I/O limited condition does not exist, or until there is impact on the performance of the graphics controller. The decrease of the frequency may be based on the bins (e.g., two bins per decrease) until the I/O metrics is in an acceptable range. From block 615, the process may continue at block 605.

From the block 610, when the I/O limited condition does not exists, the process may flow to block 620 where it may be determined whether a current magnitude of the I/O metric is at or lower than a low or down threshold (e.g., down threshold 510 shown in FIG. 5). From the block 620, if the current magnitude of the I/O metric is not at or lower than the down threshold, the process may flow to block 605. However, if the current magnitude of the I/O metric is at or lower than the down threshold, the process may then flow to block 625 where the frequency of the graphics controller may be increased. The increase of the frequency may be based on a difference between the down threshold and a current magnitude of the I/O metric. When the difference is high, the increase may be more. When the difference is low, the increase may be less. Alternatively, the increase of the frequency may be performed iteratively. For example, the frequency may continue to be increased in small amounts until the current magnitude the I/O metric indicates that is in the acceptable range (e.g., between the up threshold 505 and the down threshold 510 shown in FIG. 5). The increase of the frequency may be based on the frequency bins (e.g., two bins per increase) until the I/O metrics is in an acceptable range. From the block 625, the process may continue at block 605.

The method described above may be implemented as a set of logic instructions stored in a machine- or computer-readable storage medium such as random access memory (RAM), read only memory (ROM), programmable ROM (PROM), flash memory, etc., in configurable logic such as programmable logic arrays (PLAs), field-programmable gate arrays (FPGAs), complex programmable logic devices (CPLDs), in fixed-functionality logic hardware using circuit technology such as application-specific integrated circuit (ASIC), complementary-symmetry metal-oxide-semiconductor (CMOS) or transistor-transistor logic (TTL) technology, or any combination thereof. For example, computer program code to carry out operations shown in the method may be written in any combination of one or more programming languages, including an object oriented programming language such as C++ or the like and conventional procedural programming languages, such as the "C" programming language or similar programming languages.

In embodiments, the invention may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to integrated circuit (IC) chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. might be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. An apparatus comprising:
a graphics controller;
an input/output (I/O) queue to store graphics I/O requests;
a graphics I/O controller to manage the queue;
logic to determine whether an I/O limited condition exists based on a metric associated with an input/output (I/O) queue, wherein the I/O limited condition is to be associated with the graphics controller, wherein the I/O limited condition exists if a magnitude of the metric is equal to or greater than a first threshold, and wherein the I/O limited condition does not exist if the magnitude of the metric is equal to or less than a second threshold;
logic to cause a frequency of the graphics controller to be decreased if the I/O limited condition exists to enable a reduction of power consumption by the graphics controller; and
logic to cause the frequency of the graphics controller to be increased if the I/O limited condition does not exist,
wherein the graphics I/O controller has a frequency that can be maintained as the frequency of the graphics controller varies, and
wherein the graphics controller is to be configured to process a graphics workload having multiple frames, and wherein the logic is to decrease or increase the frequency of the graphics controller independently of a frame boundary associated with the frames.

2. The apparatus of claim 1, wherein the logic to cause the frequency of the graphics controller to be decreased includes logic to wait for a first time period after determining that the I/O condition exists, and logic to indicate whether the I/O limited condition still exists after the first time period.

3. The apparatus of claim 2, wherein the logic to cause the frequency of the graphics controller to be increased includes logic to wait for a second time period after determining that the I/O condition does not exist, and logic to indicate that the I/O limited condition still does not exist after the second time period.

4. The apparatus of claim 3, wherein the frequency of the graphics controller is decreased or increased by iteratively changing the frequency of the graphics controller by a frequency amount and checking to determine whether the I/O limited condition exists.

5. The apparatus of claim 4, wherein the frequency amount corresponds to a frequency bin.

6. The apparatus of claim 3, wherein the frequency of the graphics controller is decreased or increased based on a difference between a current magnitude of the metric and a respective first threshold or second threshold.

7. The apparatus of claim 6, wherein the frequency of the graphics controller is decreased or increased by a first amount when the difference between the current magnitude of the metric and the respective first threshold or second threshold is relatively large and by a second amount when the difference between the current magnitude of the metric and the respective first threshold or second threshold is relatively small, wherein the first amount is to be greater than the second amount.

8. A computer-implemented method comprising:
determining a metric associated with an input/output (I/O) queue that is managed by a graphics I/O controller, wherein a magnitude of the metric is high if the I/O queue is full and low if the I/O queue is not full, and wherein the I/O queue is associated with a graphics controller;
decreasing a frequency of the graphics controller when the magnitude of the metric is at or greater than a first threshold; and
increasing the frequency of the graphics controller when the magnitude of the metric is at or less than a second threshold, wherein the second threshold is associated with a value less than a value associated with the first threshold,
wherein the decreasing and increasing of the frequency of the graphics controller is performed independently of a frame boundary associated with frames to be processed by the graphics controller.

9. The method of claim 8, wherein the decreasing the frequency of the graphics controller is performed based on the magnitude of the metric continuing to be at or greater than the first threshold after a first time period.

10. The method of claim 9, wherein the increasing the frequency of the graphics controller is performed based on the magnitude of the metric continuing to be at or less than the second threshold after a second time period.

11. The method of claim 10, wherein the decreasing or increasing the frequency of the graphics controller is performed iteratively based on changing the frequency of the graphics controller and comparing the magnitude of the metric with the respective first threshold or second threshold.

12. The method of claim 11, wherein the frequency of the graphics controller is decreased or increased based on a frequency bin.

13. The method of claim 10, wherein the frequency of the graphics controller is decreased or increased based on the magnitude of the metric relative to the respective first threshold or second threshold.

14. A system comprising:
a processor;
an external power supply coupled to the processor;
a graphics controller coupled to the processor; and
logic to decrease a frequency of the graphics controller if an input/output (I/O) limited condition exists and increase the frequency if the I/O limited condition does not exist, wherein the I/O limited condition exists if a magnitude of a metric associated with an I/O queue that is managed by a graphics I/O controller is at or greater than a first threshold, and wherein the I/O limited condition does not exist when the magnitude of the metric is at or less than a second threshold,
wherein the frequency of the graphics controller is decreased based on the I/O limited condition continuing to exist after a first time period, and wherein the frequency of the graphics controller is increased based on the I/O limited condition continuing not to exist after a second time period.

15. The system of claim 14, wherein the graphics controller is configured to operate at the decreased or increased frequency independently of a frame boundary associated with frames to be processed by the graphics controller.

16. The system of claim 15, wherein the frequency of the graphics controller is decreased or increased by iteratively changing the frequency of the graphics controller and checking to determine whether the I/O limited condition exists.

* * * * *